United States Patent [19]

Tollefson

[11] Patent Number: 4,745,508
[45] Date of Patent: May 17, 1988

[54] PLASTIC SUPPLY TAPE GUIDE FOR VIDEOCASSETTE

[75] Inventor: Dale T. Tollefson, Woodbury, Minn.

[73] Assignee: Minnesota Mining and Manufacturing Company, St. Paul, Minn.

[21] Appl. No.: 797,433

[22] Filed: Nov. 13, 1985

[51] Int. Cl.⁴ .............................................. G11B 23/08
[52] U.S. Cl. ................. 360/130.21; 360/133; 242/199
[58] Field of Search ............... 360/130.2–130.33, 360/97–99; 242/197–199

[56] References Cited

U.S. PATENT DOCUMENTS

| | | | |
|---|---|---|---|
| 3,027,352 | 3/1962 | Walling et al. | 260/67 |
| 3,318,848 | 5/1967 | Clarke | 260/67 |
| 3,418,280 | 12/1965 | Orgen | 260/67 |
| 4,204,654 | 5/1980 | Gebeke | 242/199 |
| 4,276,575 | 6/1981 | Schoettle et al. | 360/130.21 |
| 4,365,769 | 12/1982 | Shoji | 242/199 |

FOREIGN PATENT DOCUMENTS

| | | |
|---|---|---|
| 3201444 | 8/1982 | Fed. Rep. of Germany ............ 360/130.21 |
| 3218097 | 12/1982 | Fed. Rep. of Germany . |
| 6028063 | 7/1983 | Japan ............ 360/130.21 |

Primary Examiner—John H. Wolff
Attorney, Agent, or Firm—Donald M. Sell; James A. Smith; Warren R. Bovee

[57] ABSTRACT

When a supply tape guide of a VHS or Betamax videocassette is plastic rather than the usual stainless steel, equal or better performance is attained when the plastic is a blend of acetal copolymer and a small proportion of lubricant and anti-static agent. The same plastic may be used for either or both of the supply sleeve and the supply pin, and both can be molded of that plastic as a single piece.

8 Claims, 1 Drawing Sheet

PLASTIC SUPPLY TAPE GUIDE FOR VIDEOCASSETTE

FIELD OF THE INVENTION

The invention concerns videocassettes and is particularly concerned with an improved supply tape guide for a videocassette of the "VHS" or the "Betamax" format. The supply tape guide may be either a supply pin or a supply sleeve.

BACKGROUND ART

It is believed that both the supply pin and the supply sleeve of every VHS videocassette now on the market are stainless steel. The Betamax videocassette operates at slower fast-forward and rewind speeds and lower tape tension, thus making it possible for a few companies to market Betamax videocassettes in which either or both of those supply tape guides is or are plastic, but it is believed that every such company recognizes the inferiority of plastic supply tape guides by offering at higher cost a Betamax videocassette in which both of the supply tape guides are stainless steel.

In order for a videocassette to meet recognized specifications, a stainless steel supply pin must have very smooth surfaces. A typical specification for the supply pin is based on peak-to-peak roughness measurements and permits no more than the following:

| Peak size (micrometers) | Max. No. of Peaks |
| --- | --- |
| 0.125 | 50 |
| 0.25 | 25 |
| 0.627 | 2 |
| 1.25 | 0 |

A rougher surface would undesirably increase tape tension and might unduly scratch the recording layer of the tape. The attain a desirably smooth surface requires careful grinding. Furthermore, stainless steel inevitably is slightly magnetic, so that a stainless steel supply pin or sleeve may slightly degrade recorded signals, regardless of the degree of care used to avoid magnetism.

Because the backside of the tape rides on the supply sleeve, the surface of a stainless steel supply sleeve does not need to be as smooth as that of a stainless steel pin. An average peak-to-peak roughness of 0.3 micrometer or better meets typical specifications.

The use of stainless steel to make the supply sleeve involves a special problem in that a metal supply sleeve has a seam which should be positioned out of contact with the tape. To do this, each end of the supply sleeve is formed with a notch that fits over a v-lug in the base to keep the sleeve from rotating, hence keeping its seam out of contact with the tape. In a typical automated assembly line, mechanism at one station rotates the sleeve until the notch fits onto the lug, and mechanism at a second station checks that fit.

U.S. Pat. No. 4,365,769 (Shoji) says that videocassette tape guides (including the supply pin and supply sleeve) has been made of stainless steel coated with a hard chrome plating or a nickel plating. The patent concerns a nickel-tin alloy plating which is said to reduce the "static frictional coefficient" as compared to the prior platings.

German Offenlegungsschrift DE. No. 3218097 filed May 13, 1982 (assigned to TDK Electronic Co., as is the earlier filed Shoji patent) concerns such tape guides which it indicates may be stainless steel that is polished and lapped to have a smooth surface. It says that the guides are often damaged by contacting each other before being incorporated into videocassettes, attributing this to the fact that steel pins have a Mohs' hardness of about 5. Its answer is to make the guides from glass or ceramic which have a Mohs' hardness of about 7 and are much less susceptible to surface damage.

THE INVENTOR'S PRIOR FAILURES

Over a period of time, the inventor has been talking to plastics vendors seeking a plastic to substitute for stainless steel to make one or both supply tape guides of a videocassette. Each vendor was asked to supply the plastic which might provide the best lubricity in contact with either the recording layer or the backside of a videocassette tape. Nylon and several acetal copolymers were tested, but the heat generated in a plastic supply tape guide during prolonged fast forward or rewind would result in stiction that sometimes was so great as to prevent the tape from being driven. Microscopic examination indicated localized melting of the plastic.

DISCLOSURE OF INVENTION

The invention provides a magnetic recording tape videocassette which like all videocassettes now on the market has a supply tape guide and like some of them, one or both of its supply tape guides is plastic. However, unlike videocassettes now on the market which have plastic supply tape guides, the performance of videocassettes of the invention is equal to or better than those which have only stainless steel tape guides. The performance of the novel videocassettes at high temperatures and humidity is outstanding, showing better tracking and significantly less RF loss as compared to videocassettes having only stainless steel supply sleeves and pins. These surprising results have been attained in both the VHS and Betamax formats and are achieved by forming one or both supply tape guides from a blend of acetal copolymer and a small proportion of lubricant and anti-static agent.

Another aspect of the invention is that the aforementioned surprising results are attained even when the surface of the supply pin is quite rough, e.g., 10 micrometers peak-to-peak. Since that or less roughness can be readily attained by conventional injection molding, there is no need to machine the molded supply tape guides or to take any special precautions in making molds. Hence, the invention provides important economies compared to stainless steel pins. Furthermore, the mold may have either an end gate or a tunnel gate. Although the former tends to result in much greater roughness at the far end compared to the gate end, the use of an end gate has not yielded any noticeable difference in performance compared to supply pins molded with a tunnel gate.

When a videocassette of the invention has a plastic supply sleeve, its inner surface preferably is cylindrical except in an area where the wall of the supply sleeve has a relatively thick section extending axially. Then when pressing the supply sleeve onto a cylindrical projection (like that of present videocassettes except having no v-lug), the supply sleeve is distorted and thus assumes a slightly oval shape that prevents it from rotating. Also, because of the relatively thick section, it is feasible to mold the supply sleeve from an end gate, so that there is no need to orient the gate away from the tape. This permits two stations to be eliminated from a typical assembly line, namely, the sleeve-rotating station and the subsequent checking station mentioned above.

Because of the close proximity of the supply sleeve to the supply pin, they can be molded as a single piece of plastic, thus further simplifying manufacture and assembly of a videocassette. In doing so, the inner surface of the supply sleeve preferably is completely cylindrical, because there is no rotation problem.

Because the backside of a videocassette tape has a significant surface roughness compared to the mirror-like recording layer, it may tend to abrade a plastic supply sleeve even when that supply sleeve is made in accordance with the invention. Abrasion is more significant in the VHS format than in the Betamax format. Hence, the acetal plastic supply sleeve of the invention may be useful in VHS videocassettes only when the backside roughness of the tape is close to the minimum provided by typical specifications. On the other hand, the Betamax format permits use of the novel acetal plastic supply sleeve even when the tape backside is quite rough. The reason for this is due not only to the lower Betamax tape speeds and tension, but also to the fact that the tape makes a substantially smaller angle of wrap around a Betamax supply sleeve than it does around a VHS supply sleeve.

THE DRAWING

The invention may be more readily understood with reference to the drawing in which:

FIG. 1 schematically illustrates the tape path of a VHS videocassette and the position of its supply pin and supply sleeve;

Figure 1:
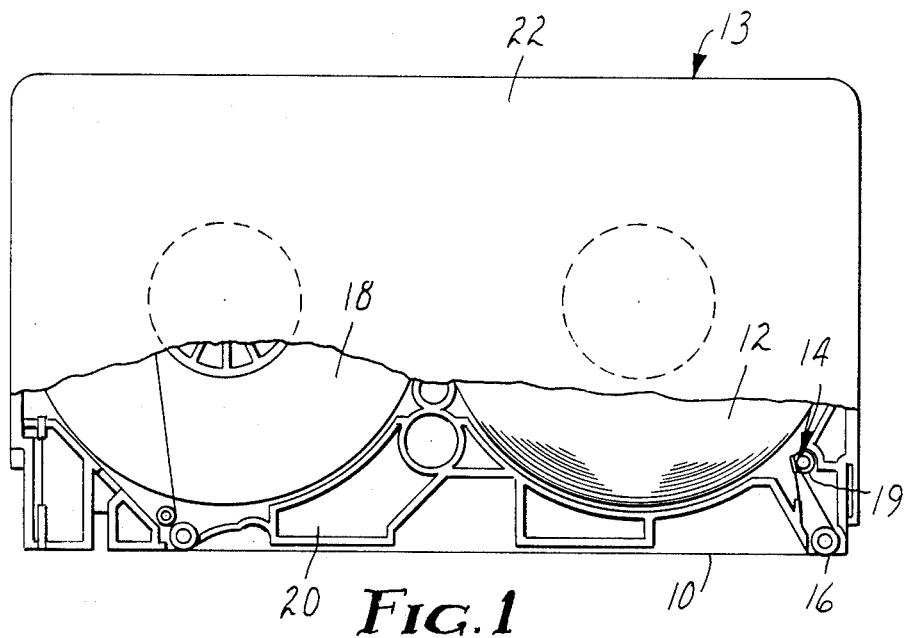

Referring first to FIG. 1, magnetic recording tape 10 extends from a supply reel 12 of a VHS videocassette 13, with its magnetizable layer against a cylindrical acetal plastic supply pin 14 and its backside against a stainless steel or acetal plastic supply sleeve 16, and then across the front of the cassette to a takeup reel 18. Each end of the acetal supply pin 14 is press-fitted into a cylindrical opening in a boss 19 (one shown) in each of the base 20 and cover 22 of the videocassette.

Figure 2:
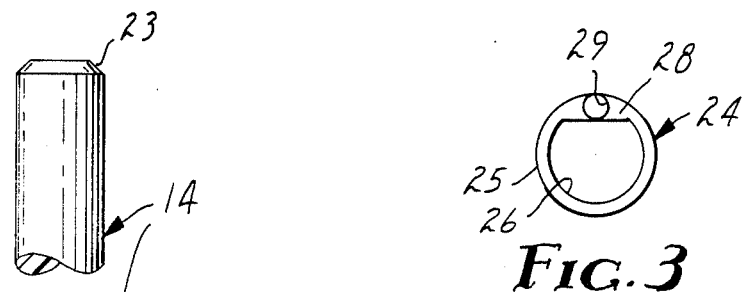
FIG. 2 is a side view of the supply pin of the videocassette of FIG. 1, greatly enlarged.

As seen in FIG. 2, each end of the plastic supply pin 14 has a chamfer 23 to enhance insertion into the openings in the bosses 19.

Figure 3:
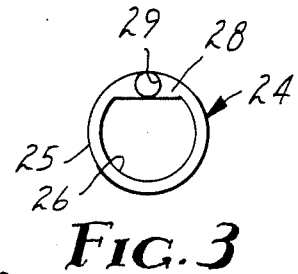
FIG. 3 is an end view of an acetal plastic supply sleeve of the invention.

The acetal plastic supply sleeve 24 shown in FIG. 3 has a cylindrical outer surface 25, and its inner surface 26 is cylindrical except being flat at a relatively thick section 28 which extends axially the full length of the supply sleeve. The area of this thick section 28 at the end of the plastic supply sleeve is sufficient to permit the plastic supply sleeve 16 to be injection molded at an end gate 29.

Figure 4:
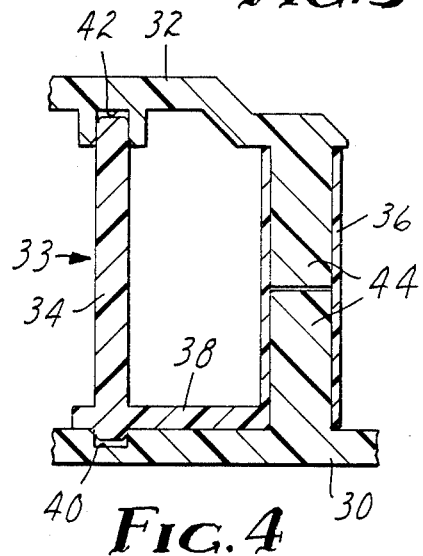
FIG. 4 is a central section though an acetal plastic piece incorporating both a supply pin and a supply sleeve.

FIG. 4 shows a fragment of a Betamax videocassette comprising a base 30 and a cover 32 between which has been assembled a single acetal plastic piece 33 which includes both a supply pin 34 and a supply sleeve 36 interconnected by an arm 38. Each end of the supply pin 34 is chamfered for easy insertion into cylindrical openings 40 and 42 of the base 30 and cover 32, respectively. The supply sleeve 36, which has a completely cylindrical inner surface, fits over a pair of projections 44 on the base and cover.

ACETAL COPOLYMER BLEND

An oxemethylene copolymer containing about 98 weight percent of recurring —$OCH_2$— groups derived from trioxane and about 2 weight percent of comonomer units having the formula —$OCH_2CH$— and derived from ethylene oxide was prepared as described in U.S. Pat. No. 3,027,352, and melt hydrolyzed according to the procedure described in U.S. Pat. Nos. 3,318,848 and 3,418,280 to stabilize the ends of the polymer chains. The resulting acetal copolymer possessed a crystallinity of approximately 75 percent, a number average molecular weight of approximately 10,000, an inherent viscosity of approximately 1.0 (measured at 60° C. in a 0.1 weight percent solution in p-chlorophenol containing 2 weight percent of alphapinene), a melting temperature of about 165° C., and a melt index of about 27 when tested in accordance with ASTM method D1238-82.

To the above described acetal copolymer the following components are added:

| | |
|---|---|
| Hindered phenolic antioxidant | 0.5% |
| Acid scavenger | 0.1% |
| Nucleating agent | 0.5% |
| Internal lubricant | 1–5.0% |
| Antistatic agent | 0.5–2% | thus providing a preferred blend of acetal copolymer and a small proportion of lubricant and anti-static agent having the following properties:

| | ASTM Test Method | |
|---|---|---|
| Tensile strength @ yield (psi) | D 638 | 7300 |
| Elongation @ break (%) | D 638 | 90 |
| Flexural strength (psi) | D 730 | 10,600 |
| Flexural modulus (psi) | D 790 | 320,000 |
| Notched izod impact (ft-lb/in) | D 256 | 0.95 |
| Coefficient of Friction against steel | D 1894 | 0.10 |
| Time to wear failure @ 50 psi and 300 ft/min against steel (min) | * | >120 |

*measured on a Faville/Levally Corp. LFW-6 thrust washer test machine.

EXAMPLE 1

Using a 2-piece injection mold, the acetal plastic supply pin 14 shown in FIG. 1 was molded through a tunnel gate using the above-identified blend of acetal copolymer, lubricant and anti-static agent. The nozzle temperature was 190°–200° C., and the cooling water temperature was 70° C. on the cavity side and 10° C. on the ejector side. Molding cycle time was 8 seconds. For venting there was from 5 to 8 micrometers difference between the inner diameter of the mold and the diameter of the plastic supply pin. The tunnel gate was 0.5 mm in diameter and its center was 1.75 mm from the end of the supply pin so that when the videocassette was assembled, the gate was fully inserted into one of the bosses 19.

Surface roughnesses of the cylindrical outer surface were

|  | in micrometers peak to peak |
|---|---|
| at the gate end: | 1.25 |
| at the middle: | 7.5 |
| at the far end: | 1.25 |

Dimensions were:

| Length | 2.15 cm |
|---|---|
| Diameter | 0.24 cm |

EXAMPLE 2

An acetal plastic supply pin 14 was molded identically to that of Example 1 except that the mold had an end gate, and the blend incorporated 5% by weight of carbon black pigment. Surface roughnesses of the cylindrical outer surface were

|  | in micrometers peak to peak |
|---|---|
| at the gate end: | 1.25 |
| at the middle: | 2.5 |
| at the far end: | 10.0 |

Five VHS videocassettes were assembled with each of the acetal plastic supply pins of Examples 1 and 2 and stainless steel supply sleeves and tested at 21° C., 50% RH, in comparison to two VHS videocassettes equipped with stainless steel supply pins and sleeves. The smoothness of each of the stainless steel supply pins and sleeves was better than the aforementioned specifications. Tape (scanner) tension was measured at the beginning of and after 200 passes, and RF loss was measured throughout the test.

| Example | Scanner Tension (g) Initial | After | RF Loss Range (dB) |
|---|---|---|---|
| 1 | 63 | 80 | −1.5 to −1.9 |
| 2 | 60 | 82 | −1.5 to −1.8 |
| Steel tape guides | 61 | 78 | −2.0 to −2.3 |

Results show that the scanner tension of VHS videocassettes equipped with acetal plastic supply pins of the invention plus stainless steel supply sleeves is substantially equal in quality to videocassettes equipped with stainless steel supply pins and sleeves. On the other hand, the reduced RF loss is an important quality advantage.

Two videocassettes of Example 2 were also tested for RF loss at 40° C., 80% RH, showing an average loss of 2.0 dB compared to an average loss of 3.3 dB by two videocassettes having stainless steel supply pins and sleeves. Tracking of the Example 2 cassette was satisfactory both at 21° C., 50% RH and at 40° C., 80% RH, but at the latter conditions, the cassette having steel supply pins and sleeves experienced a slight tracking problem.

EXAMPLE 3

The acetal plastic supply sleeve 24 shown in FIG. 3 was injection molded at the end gate 29 using the above-identified blend of acetal copolymer, lubricant and antistatic agent. Molding conditions were essentially as in Example 1.

Surface roughness of the cylindrical outer surface was

|  | in micrometers peak to peak |
|---|---|
| at the gate end: | 1.25 |
| at the middle: | 1.25 |
| at the far end: | 1.25 |

Dimensions were:

| Length: | 1.8 cm |
|---|---|
| Outer diameter: | 0.52 cm |
| Inner cylindrical diameter: | 0.38 cm |
| Minimum inner diameter: | 0.355 cm |
| Diameter of projections onto which it was fitted: | 0.355 cm |

Three VHS videocassettes, each equipped with this acetal plastic supply sleeve and a stainless steel supply pin were tested as in Examples 1 and 2 in comparison to three cassettes having stainless steel supply pins and sleeves. Results at 21° C., 50% RH were:

| Example | Scanner Tension (g) Initial | After | Average RF loss (dB) |
|---|---|---|---|
| 3 | 67 | 80 | −2.2 |
| Steel tape guides | 60 | 85 | −2.3 |

When the tape backside had a relatively rough coating, the videocassettes of Example 3 experienced unsatisfactory tracking, although tracking was satisfactory in the videocassettes having only stainless steel tape guides. When the tape backside had a coating which was relatively smooth and yet within typical specifications tracking of the videocassette of Example 3 was satisfactory.

EXAMPLES 4 AND 5

A number of Betamax videocassettes were equipped with an acetal plastic supply pin similar to that of Example 2 and a stainless steel supply sleeve (Example 4) and with a stainless steel supply pin and an acetal plastic supply sleeve like that of Example 3 (Example 5). These were compared to cassettes having RF loss to cassettes having stainless steel supply pins and sleeves as in Examples 1 and 2. Results of testing three of each of these videocassettes at each set of conditions were:

| Example | Average RF Loss At 21° C., 50% RH | At 40° C., 80% RH |
|---|---|---|
| 4 (plastic pin) | −2.5 db | −2.8 db |
| 5 (plastic sleeve) | −2.2 db | −2.7 db |
| steel tape guides | −2.5 db | −4.8 db |

Tracking of all of the cassettes was satisfactory at 20° C., 50%. At 40° C., 80% RH, tracking of the cassettes of Example 4 was satisfactory, but there was a slight tracking problem with the three cassettes of Example 4 and with one of the cassettes having only steel tape guides, while the other two cassettes having only steel tape guides showed a bad tracking problem.

I claim:

1. A magnetic recording tape videocassette having at least one plastic supply tape guide which comprises a supply pin which is fully inserted into a boss which is formed with an opening for receiving said supply pin, said supply pin having a tunnel gate which is fully inserted into said boss.

2. A videocassette according to claim 1 wherein said plastic supply pin is an acetal copolymer having substantially the following properties:

| | |
|---|---|
| Tensile strength @ yield | 7,300 psi |
| Elongation @ break (%) | 90% |
| Flexural strength | 10,600 psi |
| Flexural modulus | 320,000 psi |
| Notched izod impact | 0.95 ft-lb/in. |
| Coefficient of Friction against steel | 0.10 |
| Time to wear failure @ 50 psi and 300 ft/min against steel | 120 min. |

3. A magnetic recording tape videocassette comprising at least one plastic supply sleeve having a non-cylindrical inner surface and wherein said supply sleeve can be resiliently flexed to fit over a cylindrical supporting projection and frictionally engage said supporting projection to prevent the sleeve from rotating thereon as the recording tape passes over said sleeve.

4. Videocassette as defined in claim 3 wherein the wall of the supply sleeve is of substantially uniform thickness except for a relatively thick section extending axially.

5. Videocassette as defined in claim 4 wherein the inner surface of the supply sleeve is substantially flat at said relatively thick section.

6. Videocassette as defined in claim 5 wherein the supply sleeve has an end gate at said relatively thick section.

7. Videocassette as defined in claim 2 wherein the plastic material has substantially the following properties:

| | |
|---|---|
| Tensile strength @ yield | 7,300 psi |
| Elongation @ break (%) | 90% |
| Flexural strength | 10,600 psi |
| Flexural modulus | 320,000 psi |
| Notched izod impact | 0.95 ft-lb/in. |
| Coefficient of Friction against steel | 0.10 |
| Time to wear failure @ 50 psi and 300 ft/min against steel | 120 min. |

8. A magnetic recording tape videocassette comprising a plastic supply pin and plastic supply sleeve molded integrally with a common plastic base.

* * * * *